(12) United States Patent
Vermoesen et al.

(10) Patent No.: US 6,755,117 B2
(45) Date of Patent: Jun. 29, 2004

(54) TANDEM VACUUM BOOSTER ASSEMBLY INCLUDING SLEEVE FOR AIR TRANSFER BETWEEN HIGH PRESSURE CHAMBERS

(75) Inventors: Michel Jean Vermoesen, Pittsfield, MA (US); Roger Sherrill Sexton, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/237,757

(22) Filed: Sep. 9, 2002

(65) Prior Publication Data

US 2003/0089224 A1 May 15, 2003

Related U.S. Application Data

(63) Continuation-in-part of application No. 10/036,598, filed on Nov. 9, 2001, now Pat. No. 6,588,317.

(51) Int. Cl.$^7$ ............................................. F01B 11/02
(52) U.S. Cl. ..................................... 92/169.2; 92/169.3
(58) Field of Search ........................... 91/376 R; 92/48, 92/49, 169.2, 169.3, 169.4

(56) References Cited

U.S. PATENT DOCUMENTS

| 4,256,016 A | * | 3/1981 | Thomas ..................... 92/169.2 |
|---|---|---|---|
| 4,522,108 A |   | 6/1985 | Takeuchi et al. .......... 91/376 R |
| 4,594,854 A |   | 6/1986 | Takeuchi et al. |
| 4,881,451 A |   | 11/1989 | Newhouse et al. ....... 91/376 R |
| 4,881,452 A |   | 11/1989 | Newhouse ................ 91/376 R |
| 4,987,824 A |   | 1/1991 | Shinohara et al. ......... 91/369.1 |
| 5,178,054 A |   | 1/1993 | Shinohara et al. ........ 91/376 R |
| 5,226,291 A |   | 7/1993 | Osterday et al. .......... 91/376 R |
| 5,277,100 A |   | 1/1994 | Shinohara ................. 91/376 R |
| 5,410,880 A | * | 5/1995 | Schluter .................... 92/169.3 |
| 5,878,650 A | * | 3/1999 | Osterday et al. ........... 92/169.3 |
| 6,389,951 B1 |  | 5/2002 | Castel et al. .............. 91/376 R |

* cited by examiner

*Primary Examiner*—Thomas E. Lazo
(74) *Attorney, Agent, or Firm*—Michael D. Smith

(57) ABSTRACT

A tandem vacuum booster includes a rear housing mounted to the vehicle, and a front housing mounted to the rear housing to define an interior chamber. A divider, disposed between the housings, partitions the interior chamber into primary and secondary chambers. A primary diaphragm, disposed between the rear housing and the divider, partitions the primary chamber into a primary high pressure chamber and a vacuum chamber. A secondary diaphragm, disposed between the divider and the front housing, partitions the secondary chamber into a secondary high pressure chamber and a vacuum chamber. A tie rod extends between the housings and through the chambers. A sleeve is disposed about the tie rod and extends between the high pressure chambers and is spaced from the tie rod. This sleeve defines a passage between the tie rod and itself such that air can be transferred between the high pressure chambers.

39 Claims, 3 Drawing Sheets

TANDEM VACUUM BOOSTER ASSEMBLY INCLUDING SLEEVE FOR AIR TRANSFER BETWEEN HIGH PRESSURE CHAMBERS

RELATED APPLICATIONS

The subject application is a continuation-in-part of co-pending and commonly-assigned U.S. patent application Ser. No. 10/036,598, entitled "Power Booster Sealing Mechanism" which was filed on Nov. 9, 2001 now U.S. Pat. No. 6,588,317.

FIELD OF THE INVENTION

The subject invention generally relates to a tandem vacuum booster assembly for a vehicle. More specifically, the subject invention relates to a tandem vacuum booster assembly that includes a sleeve disposed about a tie rod that to define an air passage such that air can be transferred between high pressure chambers of the assembly.

BACKGROUND OF THE INVENTION

Tandem vacuum booster assemblies are known in the art. Tandem vacuum boosters assemblies are used in the braking systems of vehicles, in combination with a master cylinder, to boost brake performance such that the brakes of the vehicle operate with increased force.

Tandem vacuum booster assemblies include a front and rear housing that defines an interior chamber of the assembly. A divider is disposed between the rear housing and the front housing to partition the interior chamber into a primary chamber and a secondary chamber. These assemblies also include a primary diaphragm and a secondary diaphragm. The primary diaphragm is disposed between the rear housing and the divider to partition the primary chamber into two chambers, a primary high pressure chamber and a primary vacuum chamber. The secondary diaphragm is disposed between the divider and the front housing to partition the secondary chamber into two chambers, a secondary high pressure chamber and a secondary vacuum chamber. A tie rod, typically two tie rods, extends between the front and rear housings and also through the primary and secondary chambers to provide structural support to the assembly, especially to the primary and secondary diaphragms.

Tandem vacuum booster assemblies also include a push rod in mechanical connection with a piston in the master cylinder. The push rod is axially moveable by differential pressures that act upon the diaphragms. More specifically, when an operator of the vehicle applies the brakes, the push rod actuates a valve which permits air to enter the assembly on one side of the primary diaphragm, the high pressure side. This air increases pressure on that side of the diaphragm which causes the primary diaphragm to move and helps to push the push rod and actuate the piston in the master cylinder. In addition, air flows from the primary high pressure chamber to the secondary high pressure chamber to increase the pressure one side of the secondary diaphragm, the high pressure side. This pressure causes the secondary diaphragm to move which also helps to push the push rod and actuate the piston in the master cylinder.

In the prior art, there are several different mechanisms for transferring air between the high pressure chambers of the assembly. For example, tandem vacuum booster assemblies may include an air passage, or passages, through an outer bead of the primary diaphragm. Other conventional tandem vacuum booster assemblies channel air from the primary high pressure chamber to the secondary high pressure chamber through walls that surround the push rod. Tubes can also be utilized to transfer the air. The tubes utilized in the prior art are attached to either the rear housing or to the divider. The conventional mechanisms in which the air is transferred from the primary high pressure chamber to the secondary high pressure chamber are deficient because these mechanisms are typically costly, and it is difficult to assemble the components associated with these mechanisms. For example, some components require specific orientations relative to the tie rods and the push rod during assembly which can be overly cumbersome to an assembly operator.

Due to the inadequacies of the prior art, including those described above, it is desirable to provide a tandem vacuum booster assembly that provides for the transfer of air from the primary high pressure chamber to the secondary high pressure chamber, that is convenient to assemble, and that is economical to manufacture and assemble.

SUMMARY OF THE INVENTION

A tandem vacuum booster assembly for a vehicle is disclosed. The tandem vacuum booster assembly of the subject invention includes a rear housing and a front housing. The rear housing is adapted to be mounted to the vehicle, and the front housing is mounted to the rear housing to define an interior chamber. A divider is disposed between the rear housing and the front housing. The divider partitions the interior chamber into a primary chamber and a secondary chamber.

A primary diaphragm is disposed between the rear housing and the divider, and a secondary diaphragm is disposed between the divider and the front housing. The primary diaphragm partitions the primary chamber into a primary high pressure chamber and a primary vacuum chamber. The secondary diaphragm partitions the secondary chamber into a secondary high pressure chamber and a secondary vacuum chamber.

The assembly of the subject invention also includes a tie rod. The tie rod extends between the front and rear housings and also through the primary and secondary chambers. A sleeve is at least partially disposed about the tie rod and extends between the primary high pressure chamber and the secondary high pressure chamber. The sleeve is also at least partially spaced from the tie rod. As a result, the sleeve defines an air passage between the tie rod and itself such that air can be transferred between the high pressure chambers.

Accordingly, the subject invention provides a tandem vacuum booster assembly that provides for the transfer of air between the primary high pressure chamber and the secondary high pressure chamber. The sleeve included in the tandem vacuum booster assembly of the subject invention is conveniently assembled by simply slipping over the tie rod. Due to this convenient assembly, the costs associated with costs associated with assembling the tandem vacuum booster assembly of the subject invention are minimized.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Referring to the figures, wherein like numerals indicate like or corresponding parts throughout the several views, a tandem vacuum booster assembly is generally disclosed at 10. As understood by those skilled in the art, the tandem vacuum booster assembly 10, hereinafter referred to as the assembly 10, is used in a vehicle in combination with a brake pedal and a master cylinder, not disclosed in the Figures, to enhance, i.e., boost, the brake performance of the vehicle.

Figure 1:
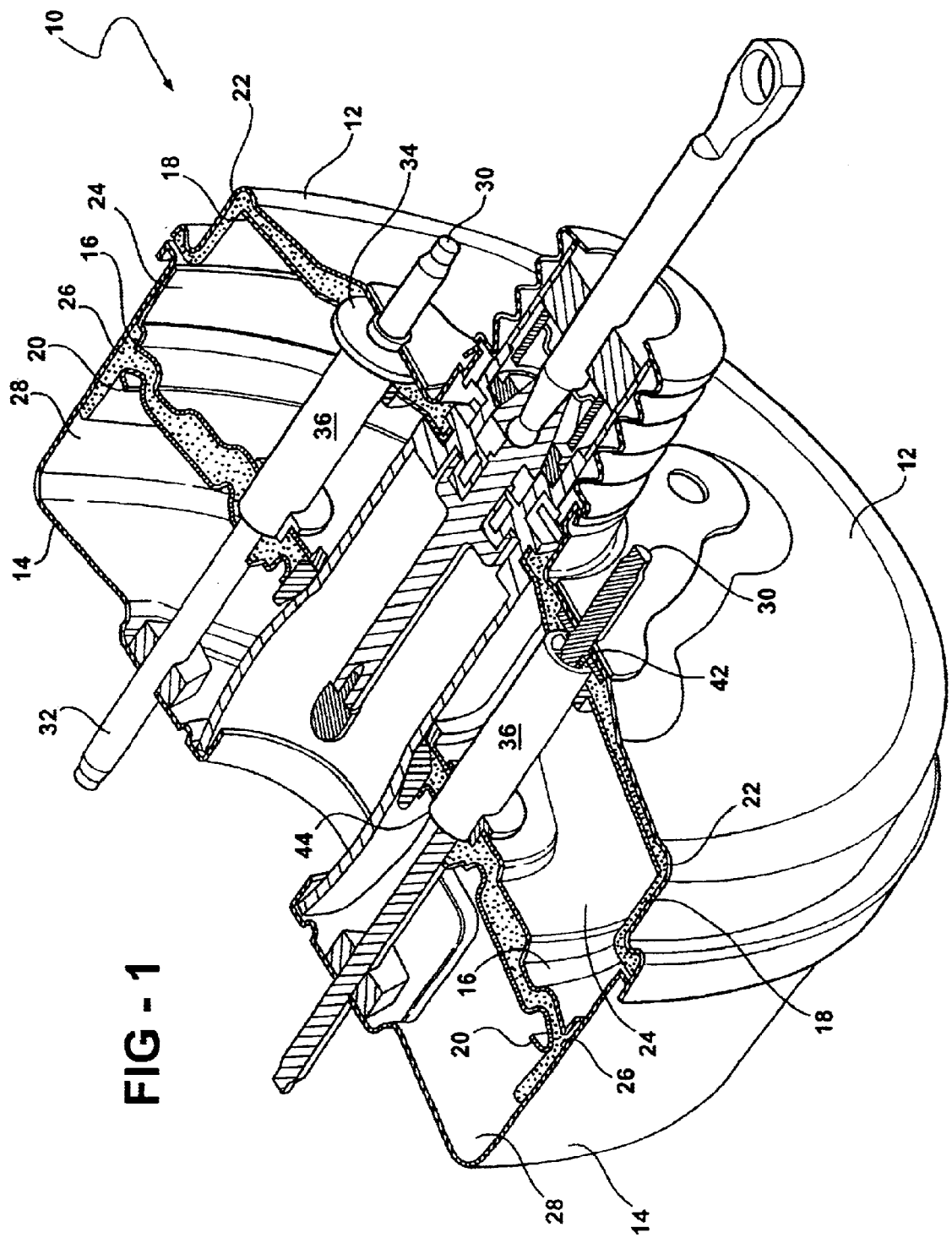
FIG. 1 is a partially cross-sectional perspective view of a tandem vacuum booster assembly according to the subject invention.

As disclosed particularly in FIG. 1, the assembly 10 includes a rear housing 12 and a front housing 14. The rear housing 12 is adapted to be mounted to the vehicle. More specifically, the rear housing 12 is frequently mounted to a fire wall of the vehicle. As understood by those skilled in the art, the rear housing 12 is adapted to be mounted to the vehicle by using fasteners, such as screws, bolts, and the like, to mount the rear housing 12 to the fire wall. The front housing 14 is mounted to the rear housing 12 to define an interior chamber. When combined, the rear housing 12 and the front housing 14 are commonly referred to as the booster shell.

A divider 16 is disposed between the rear housing 12 and the front housing 14. The divider 16 partitions the interior chamber into a primary chamber and a secondary chamber. The subject invention also includes a primary diaphragm 18 and a secondary diaphragm 20. The primary diaphragm 18 partitions the primary chamber into a primary high pressure chamber 22 and a primary vacuum chamber 24. The primary high pressure chamber 22 is defined between the rear housing 12 and the primary diaphragm 18, and the primary vacuum chamber 24 is defined between the primary diaphragm 18 and the divider 16. The secondary diaphragm 20 partitions the secondary chamber into a secondary high pressure chamber 26 and a secondary vacuum chamber 28. The secondary high pressure chamber 26 is defined between the divider 16 and the secondary diaphragm 20, and the secondary vacuum chamber 28 is defined between the secondary diaphragm 20 and the front housing 14. Also, as understood by those skilled in the art, the primary and secondary diaphragms 18, 20 include bellows 19 (refer to FIG. 2) to enhance sealing between the primary and secondary chambers 22, 24, 26, 28. The bellows 19 are described additionally below.

At least one tie rod 30 extends between the front housing 14 and the rear housing 12 and through the primary and secondary chambers 22, 24, 26, 28 of the assembly 10. The tie rod 30 includes an external surface 32 and a flange 34. The flange 34 of the tie rod 30 is disposed in the primary high pressure chamber 22. The external surface 32 and the flange 34 are described additionally below. Preferably, and as disclosed in FIG. 1, the subject invention includes a first and second tie rod 30. As understood by those skilled in the art, the tie rods 30 provide structural support to the assembly 10, especially to the primary and secondary diaphragms 18, 20 to minimize deflection.

Figure 3:
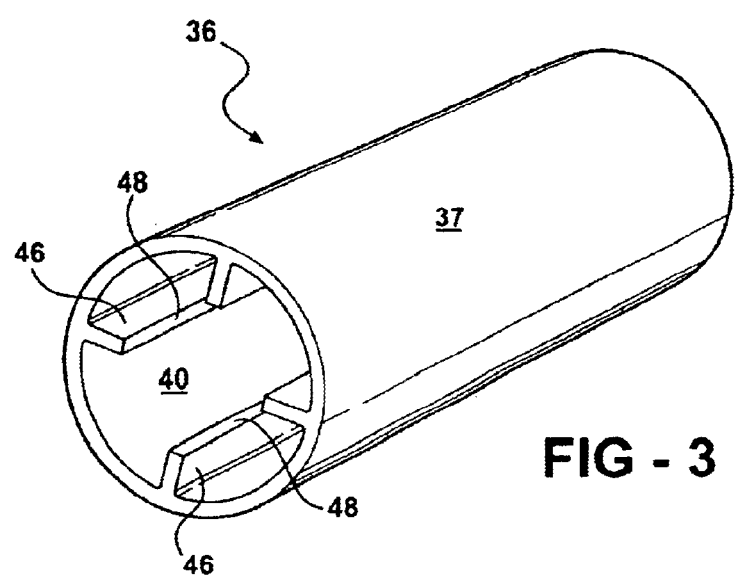
FIG. 3 is a perspective view of a tubular sleeve illustrating spacing ribs extending inwardly from an internal surface of the sleeve.
Figure 5:
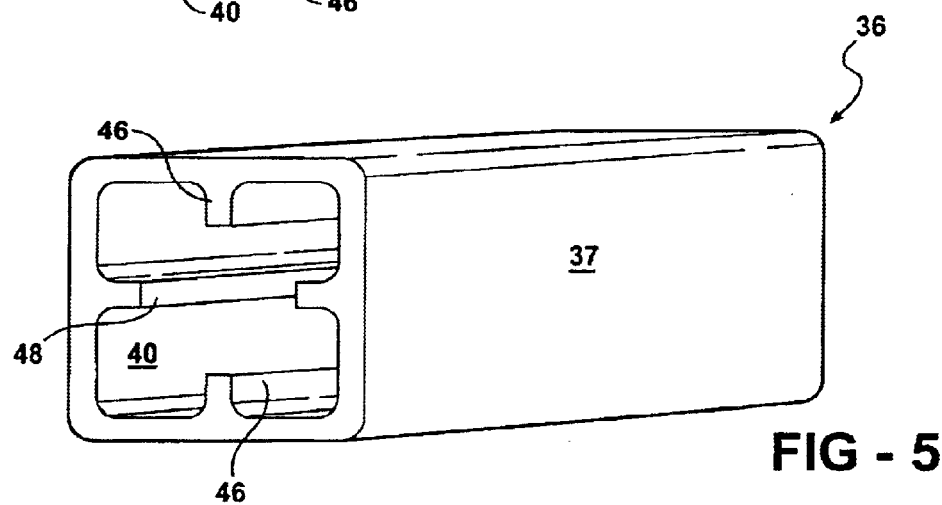
FIG. 5 is a perspective view of a squared sleeve illustrating spacing ribs extending inwardly from an internal surface of the sleeve.
Figure 6:
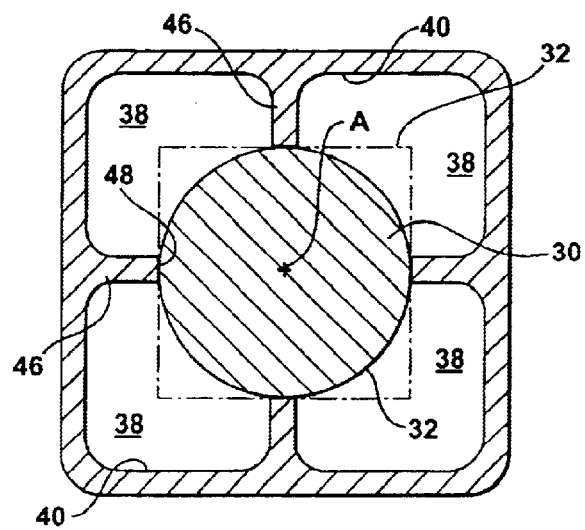
FIG. 6 is a cross-sectional view of the sleeve disposed about and spaced from a rod to define the air passage.

A sleeve 36 is at least partially disposed about the tie rod 30 and extends between the primary high pressure chamber 22 and the secondary high pressure chamber 26. Also, this sleeve 36 is at least partially spaced from the tie rod 30. The sleeve 36 defines an air passage 38 between the tie rod 30 and itself 36 such that air can be transferred between the high pressure chambers 22, 26. As disclosed best in FIGS. 3 and 5, the sleeve 36 includes an internal surface 40. The internal surface 40 is at least partially spaced from the external surface 32 of the tie rod 30 thereby defining the air passage 38 therebetween.

When the terminology "extends between" is utilized in describing the tie rod 30 and the sleeve 36, it is not required for the tie rod 30 or the sleeve 36 to extend completely between two other components. Instead, it is also possible that the tie rod 30 or sleeve 36 may only partially extend between two other components. For example, although not preferred, it is possible that the tie rod 30 may only extend from the rear housing 12 to the divider 16. This is still considered to "extend between" the front and rear housings 14, 12.

In the preferred embodiment, where there is a first tie rod 30 and a second tie rod 30, there is a first sleeve 36 that is at least partially disposed about the first tie rod 30 and a second sleeve 36 that is at least partially disposed about the second tie rod 30. However, for descriptive purposes, only one sleeve 36 and one tie rod 30 are described herein below.

Figure 2:
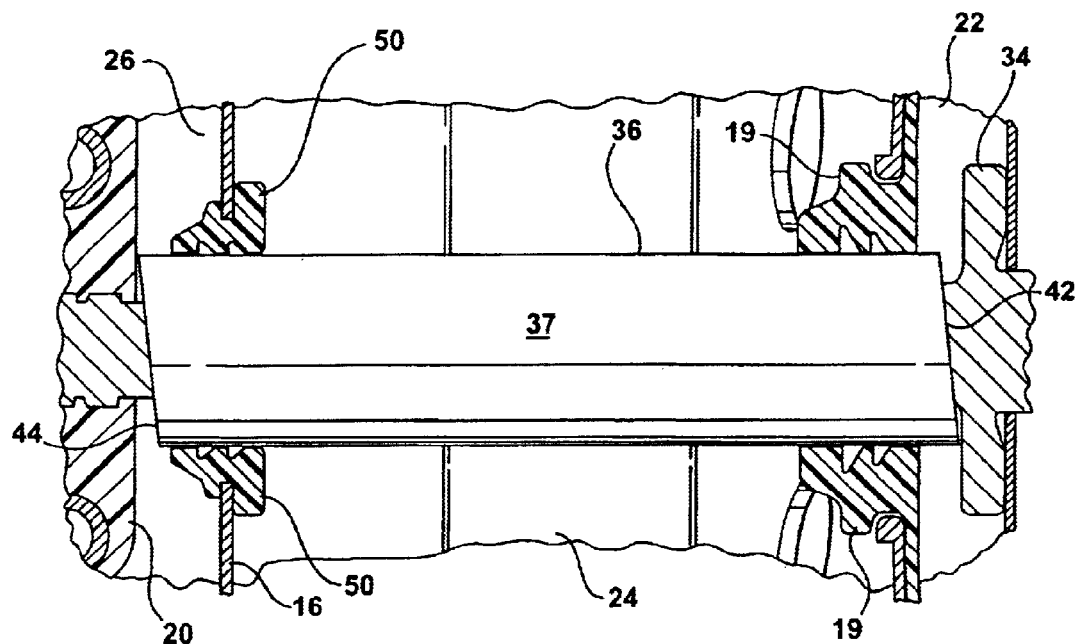
FIG. 2 is an enlarged top view of the tandem vacuum booster assembly illustrating a sleeve extending between a primary high pressure chamber and a secondary high pressure chamber.

Referring primarily to FIGS. 1 and 2, the sleeve 36 includes a first end 42 and a second end 44. The first end 42 of the sleeve 36 is disposed in the primary high pressure chamber 22 and the second end 44 of the sleeve 36 is disposed in the secondary high pressure chamber 26. Both the first and second ends 42, 44 define an opening. More specifically, the first end 42 defines a first opening in the primary high pressure chamber 22 and the second end 44 defines a second opening in the secondary high pressure chamber 26. The openings enable the air to transfer through the air passage 38 between the high pressure chambers 22, 26.

Generally, the sleeve 36 is mechanically fixed to the external surface 32 of the tie rod 30. As such, the sleeve 36 remains stationary relative to the tie rod 30 and the primary diaphragm 18 moves about the sleeve 36. More specifically, a spacing rib 46 extends between the first and second ends 42, 44 of the sleeve 36 and inwardly from the internal surface 40 of the sleeve 36 toward the external surface 32 of the tie rod 30 to mechanically fix the sleeve 36 to the tie rod 30. Preferably, as disclosed in FIGS. 3–6, the spacing rib 46 is further defined as a plurality of spacing ribs 46 that extend between the first and second ends 42, 44 of the sleeve 36 and inwardly from the internal surface 40 of the sleeve 36 toward the external surface 32. In embodiments where there is more than one spacing rib 46, it is most preferred that the ribs 46 are equally spaced about the internal surface 40 of the sleeve 36. As a result, the sleeve 36 is maintained completely and equally spaced from the tie rod 30. Although there may be only one spacing rib 46 for each sleeve 36, the subject invention is described below in terms of the plurality of spacing ribs 46.

The spacing ribs 46 maintain the sleeve 36 at least partially spaced from the tie rod 30. The spacing ribs 46 area also responsible for mechanically fixing the sleeve 36 to the tie rod 30. The spacing ribs 46 establish a friction fit at the external surface 32 of the tie rod 30. Of course, as understood by those skilled in the art, other interference fits may be used to secure the sleeve 36 relative to the tie rod 30. To appropriately fix the sleeve 36 to the tie rod 30, each of the spacing ribs 46 terminate at an edge 48. The edges 48 contact the external surface 32 of the tie rod 30 to mechanically fix the sleeve 36 relative to the external surface 32 of the tie rod 30. Preferably, the edges 48 of the spacing ribs 46 are equally spaced from a central axis A that extends longitudinally within the tie rod 30. Equal spacing of the edges 48 of the ribs 46 from the central axis A enables each rib 46 to impose in equal force about the external surface 32 of the tie rod 30 to mechanically fix the sleeve 36.

Although not required, it is most preferred that the spacing ribs 46 are integral with, i.e., one piece, the sleeve 36. However, the spacing ribs 46 may be discrete components that are mounted within the sleeve 36 to the internal surface 40.

Referring now to FIG. 2, in the primary high pressure chamber 22, the first end 42 of the sleeve 36 is angled relative to the flange 34 of the tie rod 30. As such, at least a portion of the first end 42 is spaced from the flange 34, and the first opening can receive air from the primary high pressure chamber 22. Similarly, the other end of the sleeve 36, the second end 44, is angled in the secondary high pressure chamber 26 relative to the secondary diaphragm 20. As such, at least a portion of the second end 44 is spaced from the secondary diaphragm 20, and the second opening can receive air from the air passage 38 and from the primary high pressure chamber 22 into the secondary high pressure chamber 26.

As initially set forth above, the sleeve 36 extends from the primary high pressure chamber 22, through the primary vacuum chamber 24, and through the divider 16 into the secondary high pressure chamber 26. Because it is necessary that the primary vacuum chamber 24 remains sealed from the secondary high pressure chamber 26, a seal 50 is disposed between the sleeve 36 and the divider 16. This seal 50, preferably a rubber grommet, effectively seals the primary vacuum chamber 24 from the secondary high pressure chamber 26 where the sleeve 36 extends through the divider 16.

In the most preferred embodiment, the sleeve 36 is formed, in an extrusion method of a thermoplastic material. Preferably, the extrusion method is a continuous extrusion method known to those skilled in the art. As such, the sleeve 36 is uniform with a continuous and smooth outer surface 37. That is, due to the extrusion method utilized in forming the sleeve 36, the outer surface 37 of the sleeve 36 is free of parting lines. With no parting lines, there is more ideal surface contact between the bellow 19 of the primary diaphragm 18 and the outer surface 37 of the sleeve 36 such that, during braking, the primary diaphragm 18, specifically the bellow 19 of the primary diaphragm 18, more easily glides over the outer surface 37 of the sleeve 36.

Figure 4:
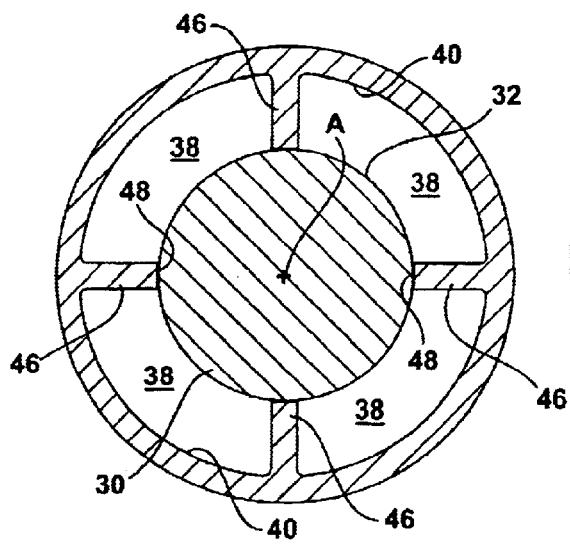
FIG. 4 is a cross-sectional view of the tubular sleeve disposed about and spaced from a tie rod to define an air passage between the tie rod and itself for transferring air.

It is also most preferred that the sleeve 36 have a constant diameter between the first and second ends 42, 44, as shown in the cross-section of FIG. 4. Due to the constant diameter, the sleeve 36 is reversible during assembly. Therefore, the way the sleeve 36 is oriented during assembly does not matter. Also due to the constant diameter, the bellow 19 of the primary diaphragm 18 slides over the outer surface 37 of the sleeve 36 such that any compressive forces between the primary diaphragm 18 and the sleeve 36 remain constant during braking. That is, during a brake application stroke, where the primary diaphragm 18 travels from a rest position to a full stroke position, the bellow 19 of the primary diaphragm 18 slides over the outer surface 37 of the tube in a consistent manner as there are no restrictions due to the constant diameter.

The angles of the first and second ends 42, 44 are identical due to cutting techniques utilized in the continuous extrusion method. Therefore, it does not matter which way the sleeve 36 of the subject invention is oriented during assembly. That is, either end of the sleeve 36 could be the first end 42 as described herein. The sleeve 36 is conveniently slipped over the tie rod 30. The spacing ribs 46 are formed of a resilient, i.e., flexible, material such that these ribs 46 can give and flex to permit easy slippage of the sleeve 36 over the tie rod 30.

It is also most preferred that the sleeve 36 is a tube (as shown in FIGS. 1–4). As understood by those skilled in the art, if the sleeve 36 is tubular, the tube may be imperfect. In the alternative embodiment for the sleeve 36 disclosed in FIGS. 5 and 6, the sleeve 36 is squared. The spacing ribs 46 still extend inwardly from the internal surface 40 of the sleeve 36 toward the external surface 32. In this alternative embodiment, the tie-rod 30 may be squared. However, it is most preferred that the tie rod 30 is cylindrical. As a result, those skilled in the art recognize that if the sleeve 36 is squared and the tie-rod 30 is cylindrical, then the sleeve 36 may require some orientation, such as a 90° orientation, during assembly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A tandem vacuum booster assembly for a vehicle comprising:

a rear housing adapted to be mounted to the vehicle;

a front housing mounted to said rear housing to define an interior chamber;

a divider disposed between said rear housing and said front housing for partitioning said interior chamber into a primary chamber and a secondary chamber;

a primary diaphragm disposed between said rear housing and said divider for partitioning said primary chamber into a primary high pressure chamber and a primary vacuum chamber;

a secondary diaphragm disposed between said divider and said front housing for partitioning said secondary chamber into a secondary high pressure chamber and a secondary vacuum chamber;

a tie rod extending between said front and rear housings and through said primary and secondary chambers; and a sleeve at least partially disposed about said tie rod and extending between said primary high pressure chamber and said secondary high pressure chamber and being at least partially spaced from said tie rod to define an air passage between said tie rod and itself such that air can be transferred between said high pressure chambers, wherein said sleeve comprises a first end and a second end and has a constant diameter between said first and second ends.

2. A tandem vacuum booster assembly as set forth in claim 1 wherein said primary high pressure chamber is defined between said rear housing and said primary diaphragm, said primary vacuum chamber is defined between said primary diaphragm and said divider, said secondary high pressure chamber is defined between said divider and said secondary diaphragm, and said secondary vacuum chamber is defined between said secondary diaphragm and said front housing.

3. A tandem vacuum booster assembly as set forth in claim 2 wherein said first end of said sleeve is disposed in said primary high pressure chamber and said second end of said sleeve is disposed in said secondary high pressure chamber such that air can transfer between said high pressure chambers but not into said primary vacuum chamber.

4. A tandem vacuum booster assembly as set forth in claim 3 wherein said first end of said sleeve defines a first opening in said primary high pressure chamber and said second end of said sleeve defines a second opening in said secondary high pressure chamber wherein said openings enable the air to transfer through said air passage between said high pressure chambers.

5. A tandem vacuum booster assembly as set forth in claim 3 wherein said tie rod comprises an external surface and said sleeve further comprises an internal surface at least partially spaced from said external surface of said tie rod.

6. A tandem vacuum booster assembly as set forth in claim 5 wherein said sleeve is mechanically fixed to said external surface of said tie rod such that said sleeve remains stationary relative to said tie rod and said primary diaphragm moves about said sleeve.

7. A tandem vacuum booster assembly as set forth in claim 5 further comprising a spacing rib extending between said first and second ends of said sleeve and inwardly from said internal surface of said sleeve toward said external surface of said tie rod to maintain said sleeve at least partially spaced from said tie rod.

8. A tandem vacuum booster assembly as set forth in claim 7 wherein said spacing rib is further defined as a plurality of spacing ribs extending between said first and second ends of said sleeve and inwardly from said internal surface of said sleeve toward said external surface to maintain said sleeve at least partially spaced from said tie rod.

9. A tandem vacuum booster assembly as set forth in claim 8 wherein each of said ribs terminate at an edge that contacts said external surface of said tie rod.

10. A tandem vacuum booster assembly as set forth in claim 9 wherein said ribs are equally spaced about said internal surface of said sleeve.

11. A tandem vacuum booster assembly as set forth in claim 10 wherein said edges of said ribs are equally spaced from a central axis extending longitudinally within said tie rod.

12. A tandem vacuum booster assembly as set forth in claim 1 wherein said tie rod comprises a flange disposed in said primary high pressure chamber.

13. A tandem vacuum booster assembly as set forth in claim 12 wherein said first end of said sleeve is angled relative to said flange of said tie rod such that at least a portion of said first end is spaced from said flange.

14. A tandem vacuum booster assembly as set forth in claim 13 wherein said second end of said sleeve is angled relative to said secondary diaphragm such that at least a portion of said second end is spaced from said secondary diaphragm.

15. A tandem vacuum booster assembly as set forth in claim 1 wherein said sleeve is formed in an extrusion method of a thermoplastic material.

16. A tandem vacuum booster assembly as set forth in claim 15 wherein said sleeve comprises an outer surface that is continuous and free of parting lines due to the extrusion method.

17. A tandem vacuum booster assembly as set forth in claim 1 wherein said sleeve extends through said divider.

18. A tandem vacuum booster assembly as set forth in claim 17 further comprising a seal disposed between said sleeve and said divider such that said primary vacuum chamber is sealed from said secondary high pressure chamber.

19. A tandem vacuum booster assembly as set forth in claim 1 wherein said tie rod is further defined as a first and second tie rod and said sleeve is further defined as a first and second sleeve with said first sleeve at least partially disposed about said first tie rod and said second sleeve at least partially disposed about said second tie rod.

20. A tandem vacuum booster assembly as set forth in claim 1 wherein said sleeve is further defined as a tube.

21. A tandem vacuum booster assembly as set forth in claim 1 wherein said sleeve is squared.

22. A tandem vacuum booster assembly for a vehicle comprising:
    a rear housing adapted to be mounted to the vehicle;
    a front housing mounted to said rear housing to define an interior chamber;
    a divider disposed between said rear housing and said front housing for partitioning said interior chamber into a primary chamber and a secondary chamber;
    a primary diaphragm disposed between said rear housing and said divider for partitioning said primary chamber into a primary high pressure chamber and a primary vacuum chamber;
    a secondary diaphragm disposed between said divider and said front housing for partitioning said secondary chamber into a secondary high pressure chamber and a secondary vacuum chamber;
    a tie rod extending between said front and rear housings and through said primary and secondary chambers and comprising an external surface; and
    a sleeve at least partially disposed about said tie rod and extending between said primary high pressure chamber and said secondary high pressure chamber and being at least partially spaced from said tie rod to define an air passage between said tie rod and itself such that air can be transferred between said high pressure chambers,
    wherein said sleeve is mechanically fixed to said external surface of said tie rod such that said sleeve remains stationary relative to said tie rod and said primary diaphragm moves about said sleeve.

23. A tandem vacuum booster assembly as set forth in claim 22 wherein said sleeve comprises an internal surface at least partially spaced from said external surface of said tie rod.

24. A tandem vacuum booster assembly as set forth in claim 23 further comprising a spacing rib extending inwardly from said internal surface of said sleeve toward said external surface of said tie rod to maintain said sleeve at least partially spaced from said tie rod.

25. A tandem vacuum booster assembly for a vehicle comprising:
    a rear housing adapted to be mounted to the vehicle;
    a front housing mounted to said rear housing to define an interior chamber;
    a divider disposed between said rear housing and said front housing for partitioning said interior chamber into a primary chamber and a secondary chamber;
    a primary diaphragm disposed between said rear housing and said divider for partitioning said primary chamber into a primary high pressure chamber and a primary vacuum chamber;

a secondary diaphragm disposed between said divider and said front housing for partitioning said secondary chamber into a secondary high pressure chamber and a secondary vacuum chamber;

a tie rod extending between said front and rear housings and through said primary and secondary chambers and comprising an external surface;

a sleeve at least partially disposed about said tie rod and extending between said primary high pressure chamber and said secondary high pressure chamber and comprising an internal surface at least partially spaced from said external surface of said tie rod to define an air passage between said tie rod and itself such that air can be transferred between said high pressure chambers; and a spacing rib extending inwardly from said internal surface of said sleeve toward said external surface of said tie rod to maintain said sleeve at least partially spaced from said tie rod.

26. A tandem vacuum booster assembly as set forth in claim 25 wherein said sleeve further comprises a first end disposed in said primary high pressure chamber and a second end disposed in said secondary high pressure chamber such that air can transfer between said high pressure chambers.

27. A tandem vacuum booster assembly as set forth in claim 26 wherein said spacing rib extends between said first and second ends of said sleeve.

28. A tandem vacuum booster assembly as set forth in claim 25 wherein said spacing rib is further defined as a plurality of spacing ribs extending inwardly from said internal surface of said sleeve toward said external surface to maintain said sleeve at least partially spaced from said tie rod.

29. A tandem vacuum booster assembly as set forth in claim 28 wherein each of said ribs terminate at an edge that contacts said external surface of said tie rod.

30. A tandem vacuum booster assembly as set forth in claim 29 wherein said ribs are equally spaced about said internal surface of said sleeve.

31. A tandem vacuum booster assembly as set forth in claim 30 wherein said edges of said ribs are equally spaced from a central axis extending longitudinally within said tie rod.

32. A tandem vacuum booster assembly for a vehicle comprising:

a rear housing adapted to be mounted to the vehicle;

a front housing mounted to said rear housing to define an interior chamber;

a divider disposed between said rear housing and said front housing for partitioning said interior chamber into a primary chamber and a secondary chamber;

a primary diaphragm disposed between said rear housing and said divider for partitioning said primary chamber into a primary high pressure chamber and a primary vacuum chamber;

a secondary diaphragm disposed between said divider and said front housing for partitioning said secondary chamber into a secondary high pressure chamber and a secondary vacuum chamber;

a tie rod extending between said front and rear housings and through said primary and secondary chambers and comprising a flange disposed in said primary high pressure chamber; and a sleeve at least partially disposed about said tie rod and extending between said primary high pressure chamber and said secondary high pressure chamber and being at least partially spaced from said tie rod to define an air passage between said tie rod and itself such that air can be transferred between said high pressure chambers, said sleeve comprising a first end disposed in said primary high pressure chamber and a second end disposed in said secondary high pressure chamber with at least one of said first end of said sleeve being angled relative to said flange of said tie rod such that at least a portion of said first end is spaced from said flange, and said second end of said sleeve being angled relative to said secondary diaphragm such that at least a portion of said second end is spaced from said secondary diaphragm.

33. A tandem vacuum booster assembly as set forth in claim 32 wherein said tie rod further comprises an external surface and said sleeve further comprises an internal surface at least partially spaced from said external surface of said tie rod.

34. A tandem vacuum booster assembly as set forth in claim 33 further comprising a spacing rib extending inwardly from said internal surface of said sleeve toward said external surface of said tie rod to maintain said sleeve at least partially spaced from said tie rod.

35. A tandem vacuum booster assembly as set forth in claim 32 wherein said sleeve is formed in an extrusion method of a thermoplastic material.

36. A tandem vacuum booster assembly as set forth in claim 35 wherein said sleeve comprises an outer surface that is continuous and free of parting lines due to the extrusion method.

37. A tandem vacuum booster assembly for a vehicle comprising:

a rear housing adapted to be mounted to the vehicle;

a front housing mounted to said rear housing to define an interior chamber;

a divider disposed between said rear housing and said front housing for partitioning said interior chamber into a primary chamber and a secondary chamber;

a primary diaphragm disposed between said rear housing and said divider for partitioning said primary chamber into a primary high pressure chamber and a primary vacuum chamber;

a secondary diaphragm disposed between said divider and said front housing for partitioning said secondary chamber into a secondary high pressure chamber and a secondary vacuum chamber;

a tie rod extending between said front and rear housings and through said primary and secondary chambers; and a sleeve at least partially disposed about said tie rod and extending between said primary high pressure chamber and said secondary high pressure chamber and being at least partially spaced from said tie rod to define an air passage between said tie rod and itself such that air can be transferred between said high pressure chambers, wherein said sleeve is formed in an extrusion method of a thermoplastic material.

38. A tandem vacuum booster assembly as set forth in claim 37 wherein said sleeve comprises an outer surface that is continuous and free of parting lines due to the extrusion method.

39. A tandem vacuum booster assembly as set forth in claim 37 further comprising a spacing rib extending inwardly from an internal surface of said sleeve toward an external surface of said tie rod to maintain said sleeve at least partially spaced from said tie rod.

* * * * *